Figure 4:
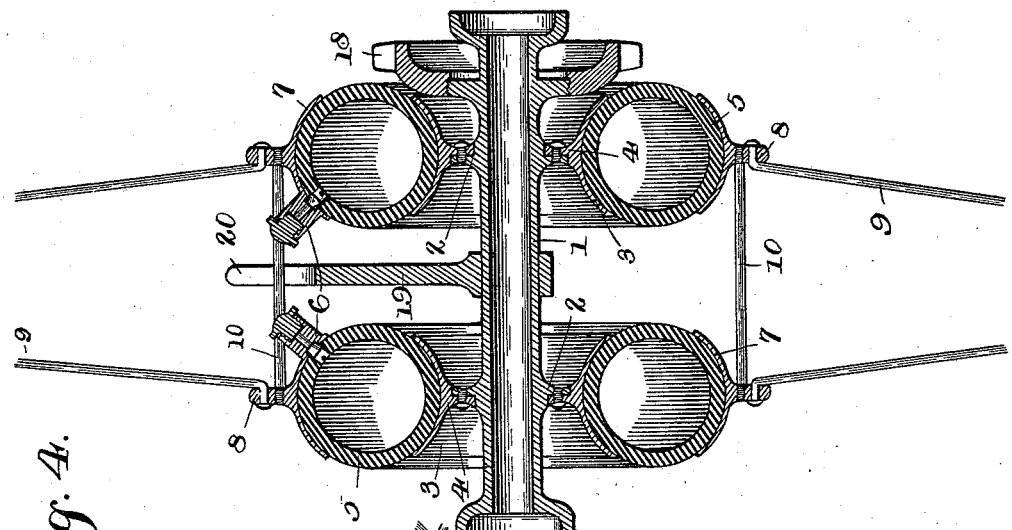

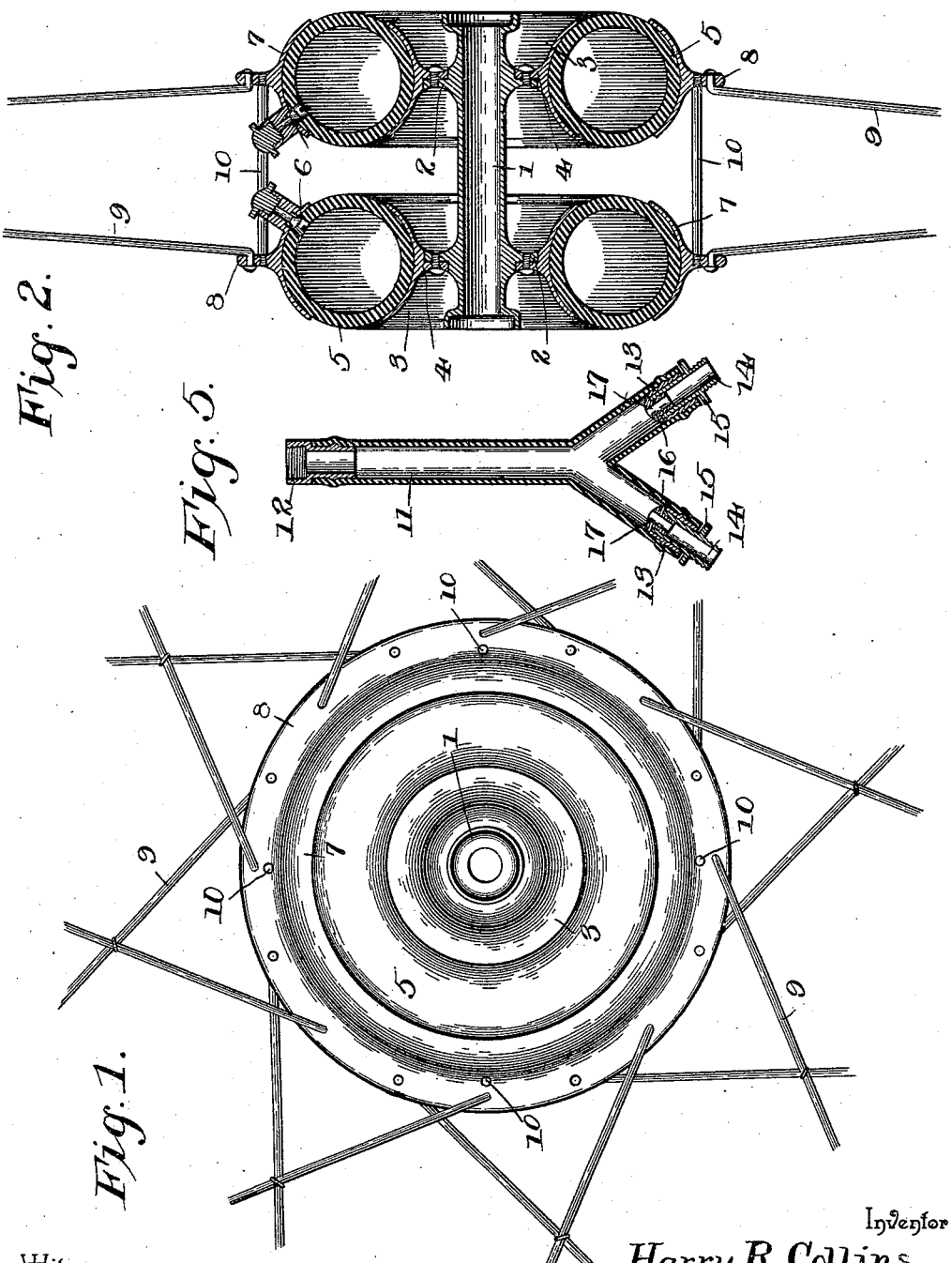

(No Model.) 2 Sheets—Sheet 2.

H. R. COLLINS.
PNEUMATIC HUB.

No. 575,634. Patented Jan. 19, 1897.

Witnesses
Chas. A. Ford.
R. M. Smith.

Inventor
Harry R. Collins,
By his Attorneys,
C. A. Snow & Co.

UNITED STATES PATENT OFFICE.

HARRY R. COLLINS, OF SOUTH BETHLEHEM, PENNSYLVANIA.

PNEUMATIC HUB.

SPECIFICATION forming part of Letters Patent No. 575,634, dated January 19, 1897.

Application filed January 16, 1896. Serial No. 575,730. (No model.)

*To all whom it may concern:*

Be it known that I, HARRY R. COLLINS, a citizen of the United States, residing at South Bethlehem, in the county of Northampton and State of Pennsylvania, have invented a new and useful Pneumatic Hub, of which the following is a specification.

This invention relates to an improvement in pneumatic hubs to be used either in connection with the wheels of bicycles or tricycles or upon other light-running vehicles.

The object of the present invention is to overcome the constant wear upon rubber tires of the pneumatic type and the constant liability of the tearing and puncturing of such tires, while at the same time retaining all the advantageous features incident to the use of tires of the character referred to.

Other objects and advantages of the invention will appear in the course of the subjoined description.

The invention consists in an improved pneumatic hub for vehicle-wheels, comprising certain novel features and details of construction and arrangement of parts, as hereinafter particularly described, illustrated in the drawings, and finally pointed out in the claim.

Figure 3:
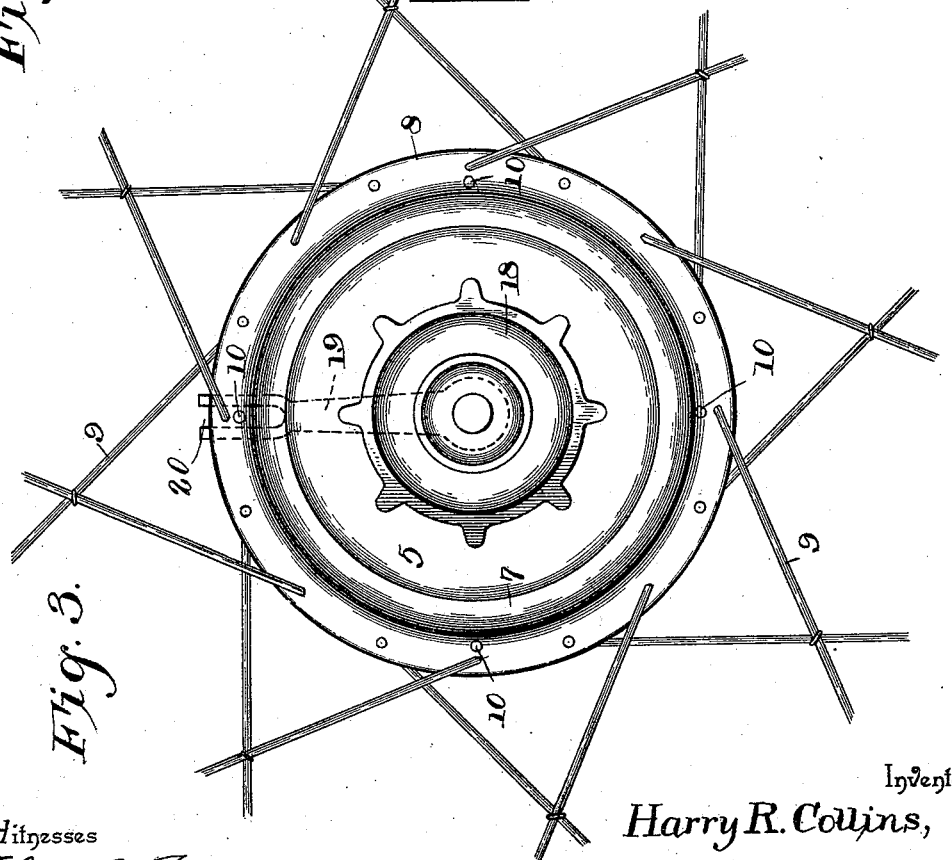

In the accompanying drawings, Figure 1 is a side elevation of a sufficient portion of a vehicle-wheel to illustrate the application of the present improvement. Fig. 2 is a transverse section through the same. Fig. 3 is a side elevation similar to Fig. 1, but showing the improvement applied to the driving-wheel of a cycle. Fig. 4 is a transverse section through the same. Fig. 5 is an enlarged detail sectional view of the bifurcated inflating tube or pipe.

Similar numerals of reference designate corresponding parts in the several figures of the drawings.

For the purpose of affording a clear understanding of the present invention, the same will be described with reference to its adaptability to an ordinary bicycle of the safety pattern.

Referring to the accompanying drawings, 1 designates the hub proper of the front or steering wheel of a bicycle, said hub being provided at its opposite ends with the usual ball-cups and at points intermediate its ends with circumferential flanges 2, to which may be rigidly attached a pair of rings or annular saddles 3. The flanges 2 are formed upon their outer opposite faces with annular rabbets, and the inwardly-projecting flanges 4 of the annular saddles 3 are correspondingly rabbeted, so that the saddles 3 may be connected with the hub by a lap-joint, while at the same time preserving the symmetry and neat appearance of the hub thus far constructed.

The saddles 3 are concavo-convex in cross-section with their concaved faces disposed outwardly, and within these saddles are arranged pneumatic tubes 5, preferably of the single-tube or hose-pipe character, and supplied with inflation-valves 6. Outside of and beyond the tubes 5 are arranged two spoke-rings 7, which, like the saddles 3, are concavo-convex in cross-section, with their concaved faces disposed inwardly and fitting the pneumatic tubes. These spoke-rings 7 are provided with peripheral flanges 8, which are perforated to receive the inner headed ends of a plurality of tangent spokes 9, and are interconnected and braced by a series of transverse horizontal rods or bars 10, preferably threaded at their opposite ends into the flanges 8 of the spoke-rings. The spokes 9 may connect at their outer ends with either a wooden or metal rim of any desired pattern, in which a solid or cushion tire may be secured. The valves of the inflatable tubes 5 project through oppositely-arranged openings in the spoke-rings, as shown in the cross-sectional views, whereby said valves are supported against creeping and are brought into proximal relation adapting them to receive and have detachably connected therewith a bifurcated inflating pipe or tube 11. This common inflating-tube is provided at its outer end with a threaded nipple 12, with which an air-pump may be connected, and its inner end is bifurcated or provided with two separate branches, one for each of the valves 6. Each of said branches has inserted fixedly therein a metal sleeve 13, within which is snugly fitted a revoluble metal tube 14, provided intermediate its ends with a knurled or milled flange 15, whereby the same may be rotated, and having its outer extremity threaded to enter the valve-stem of the pneumatic tube 5.

In the inner end of the tube 14 is inserted a headed screw 16, the under face of the head of said screw being ground to establish a smooth tight-fitting joint between it and the sleeve 13, and said screw being provided with a central perforation or air-passage 17, by means of which the air from the pump may pass to the interior of the pneumatic tubes 5. Provision is thus made for inflating both of the pneumatic tubes 5 simultaneously and affording an equal compression of air in both of said tubes, thus equalizing the balance of the spoke-rings 7 and preventing the liability of the wheel-rim to twist or become unseated from the hub.

The same description will apply to the rear or driving wheel of the machine, as illustrated in Fig. 4, with the exception that the seats or saddles for the pneumatic tubes 5 are preferably located a greater distance apart for affording increased lateral resistance to the wheel-rim, and a sprocket-wheel 18 is attached to one end of the hub for the reception of the drive-chain from the sprocket on the crank-axle. The construction of the driving-wheel also differs from the front or steering wheel in that the hub 1 is provided with a centrally-located and rigid arm 19, which extends radially between the tubes 5 and has its outer extremity bifurcated or formed with a longitudinal open slot 20, which strides one of the transverse brace-rods 10. By reason of this construction the spoke-rings 7 may play freely relatively to the hub proper, while at the same time any motion imparted to the hub of the wheel will be communicated by the arm 19 to the spoke-rings and thence to the wheel-rim.

By means of the construction above described a very simple and effective pneumatic hub for vehicle-wheels is obtained in which a broad lateral bearing is afforded between the stationary and movable parts of said hub, and in which a similar pair of pneumatic tubes are arranged side by side and adapted to be inflated by a common inflating tube or pipe. At the same time the motion of the hub proper is communicated directly to the outer movable part thereof and the rim of the wheel may accommodate itself to the unevenness of the surface of the road without imparting its vibrations to the wheel-hub, such vibration being absorbed by the pneumatic tubes. All danger of puncturing, cutting, or tearing a pneumatic tire is thus entirely avoided, while at the same time the advantages incident to the use of pneumatic tires are retained. Thus the necessity for always carrying a pump and repair outfit is avoided, and the total weight of the machine is materially reduced, the pneumatic hub-tubes both together weighing perhaps less than one-third the amount of a single pneumatic tire placed in the rim of the wheel, as in the ordinary construction.

Changes in the form, proportion, and minor details of construction may be resorted to without departing from the spirit or sacrificing any of the advantages of this invention.

Having thus described the invention, what is claimed as new is—

In a pneumatic hub for wheels, the combination with the hub proper, of spaced annular saddles surrounding the same and rigid thereon, pneumatic tubes extending around and seated on said saddles, spaced spoke-rings arranged outside of said pneumatic tubes, transverse tie-braces rigidly connecting said spoke-rings, and an arm rigidly connected to the hub proper between the saddles and having its outer end forked, whereby it is adapted to straddle and slidingly engage one of said tie-braces, substantially as described.

In testimony that I claim the foregoing as my own I have hereto affixed my signature in the presence of two witnesses.

HARRY R. COLLINS.

Witnesses:
A. L. WICKERT,
HARVEY W. KEUNSMAN.